US007819415B2

(12) United States Patent
Kio et al.

(10) Patent No.: US 7,819,415 B2
(45) Date of Patent: Oct. 26, 2010

(54) LATERAL WHEELCHAIR MOVEMENT MECHANISM

(75) Inventors: Jonathan M. Kio, Lindley, NY (US); Joshua Lujan, Land O'Lakes, FL (US); Kelly Komperud, Onalaska, WI (US); Daniel Bennett, Tampa, FL (US)

(73) Assignee: University of South Florida, Tampa, FL (US)

( * ) Notice: Subject to any disclaimer, the term of this patent is extended or adjusted under 35 U.S.C. 154(b) by 289 days.

(21) Appl. No.: 11/753,299

(22) Filed: May 24, 2007

(65) Prior Publication Data

US 2007/0280808 A1 Dec. 6, 2007

Related U.S. Application Data

(60) Provisional application No. 60/811,172, filed on Jun. 6, 2006.

(51) Int. Cl.
*B60J 9/00* (2006.01)
*B62M 1/14* (2006.01)

(52) U.S. Cl. ................................ 280/288.4; 280/250.1

(58) Field of Classification Search ............. 280/250.1, 280/288.4
See application file for complete search history.

(56) References Cited

U.S. PATENT DOCUMENTS

| | | | | | |
|---|---|---|---|---|---|
| 1,794,532 | A | * | 3/1931 | Gennaro | 280/761 |
| 2,090,768 | A | * | 8/1937 | Thomas | 180/202 |
| 2,136,570 | A | * | 11/1938 | Walker | 180/200 |
| 2,638,995 | A | * | 5/1953 | Gottlieb | 180/202 |
| 3,030,638 | A | * | 4/1962 | Verduin et al. | 5/83.1 |
| 3,215,446 | A | * | 11/1965 | Thackrey | 280/5.28 |
| 3,544,127 | A | * | 12/1970 | Dobson | 280/43.17 |
| 4,483,405 | A | | 11/1984 | Noda et al. | |
| 4,618,155 | A | * | 10/1986 | Jayne | 280/5.28 |
| 4,823,900 | A | | 4/1989 | Farnam | |
| 4,962,942 | A | * | 10/1990 | Barnett et al. | 280/5.28 |
| 4,998,595 | A | * | 3/1991 | Yeh | 180/202 |
| 5,853,059 | A | * | 12/1998 | Goertzen et al. | 180/65.6 |
| 6,032,436 | A | * | 3/2000 | Hart et al. | 53/399 |
| 6,478,099 | B1 | | 11/2002 | Madwed | |
| 6,615,937 | B2 | | 9/2003 | Richey, II et al. | |
| 2004/0154097 | A1 | * | 8/2004 | Blevins | 5/81.1 R |
| 2006/0037788 | A1 | | 2/2006 | Madwed | |

FOREIGN PATENT DOCUMENTS

| | | | |
|---|---|---|---|
| JP | 2006263104 | A | 10/2006 |
| JP | 2007195596 | A | 8/2007 |
| WO | 2006041579 | A2 | 4/2006 |

* cited by examiner

*Primary Examiner*—Lesley Morris
*Assistant Examiner*—Daniel Yeagley
(74) *Attorney, Agent, or Firm*—Jeremy Spier; Courtney M. Dunn; Smith & Hopen, P.A.

(57) ABSTRACT

Provided is an apparatus for use with a rear-wheel driven motorized wheelchair. The apparatus enables a motorized wheelchair to be used in areas that would not otherwise be possible. A motorized wheelchair, though very useful and necessary, has several mobility drawbacks. Lateral movement poses a problem to the motorized wheelchair. This apparatus provides a modification to existing rear-wheel driven motorized wheelchairs that allows the user to maneuver in tight spaces by providing a for sideways movement that would not be possible in conventional wheelchair designs.

5 Claims, 14 Drawing Sheets

R0.500
TYP
14
Ø0.375 THRU ALL
(2 PLS)
3.375
0.500

25
25
26
26
14

0.130
TYP
14
1.740
1.500
1.375
1.500
4.375

14
2.000
1.000

LATERAL WHEELCHAIR MOVEMENT MECHANISM

CROSS REFERENCE TO RELATED APPLICATIONS

This application claims priority to U.S. Provisional Patent Application 60/811,172, entitled, “Lateral Wheelchair Movement Mechanism”, filed Jun. 6, 2006, the contents of which are herein incorporated by reference.

FIELD OF INVENTION

This invention relates to wheelchairs. More specifically, this invention relates to a modification to motorized wheelchairs that enable users of motorized wheelchairs to move laterally.

SUMMARY OF INVENTION

In a general embodiment, the invention includes an apparatus for use with a wheelchair, the apparatus comprising a base with a pair of wheels and a wheelchair lift. In one embodiment, the lift comprises a first lower-linkage connected to the base at its first end, a second lower-linkage connected to the base at its first end, a first upper-linkage hingedly connected to the second end of the first lower-linkage, and a second upper-linkage hingedly connected to the second of the second lower-linkage. The scissor-like movement made possible by this arrangement allows the wheelchair to be raised and lowered. In alternate embodiments an actuator is disposed between the first upper-linkage and the second upper-linkage or between the first lower-linkage and the second lower-linkage. In a preferred embodiment, a second mechanical actuator adapted to provide rotational force to the pair of wheels. Actuators for use with either the lift mechanism or the wheels can be selected from the group consisting of electrical motors, pneumatic actuators, hydraulic pistons, relays and comb drives.

The invention allows wheelchair-bound persons the ability to maneuver their wheelchair in a more efficient manner when confined within tight spaces. Specifically, our device allows its users to move laterally, which is currently not possible with existing technology.

Typically two drive wheels and two castors control a power wheelchair. These traditional wheelchairs can move forwards and backwards and can turn on a dime. However, when operating in tight spaces it can become very difficult to maneuver. The current invention addresses this problem by allowing the wheelchair to move sideways. Sideways movement will allow easy repositioning of the wheelchair without backing up and turning.

Chair-type selection was based on the popularity of several motorized wheelchair designs currently on the market. The most popular models are three-wheeled scooters, front-wheel drive chairs, and rear-wheel drive chairs. All three designs lacked the ability to move sideways. Scooters are widely used by the elderly for mobility inside their homes but are not well suited for younger, more aggressive users. Front-wheel drive chairs have excellent durability but are not in wide use because of design restrictions including battery and motor locations. Rear-wheel drive chairs, however, are widely used by all age groups and provide a large market for the current invention and were, therefore, used as the basis for the current invention.

The current invention incorporates a five-link mechanism powered by a linear actuator that raises the wheelchair up and then laterally drives it to the left or right.

To allow for lateral movement, the unmovable rear wheels of the motorized wheelchair had to be overcome. In order to accomplish this, the rear of the wheel chair was raised enough to utilize the already existing caster wheels in front and then supply a large enough lateral force to drive the assembly sideways. For the lift, a scissoring mechanism utilizes the power provided by a linear actuator and creates a lift. To allow platform of wheelchair to extend and lift, 3"×1.5" standard Associated Aluminum Channel and pins that acted a hinges for the bending were used. For the lateral driving force, a DC gear motor is coupled with an eleven tooth #35 sprocket and chained in series with two lateral drive wheels. The mechanism controls for both motors were then wired into a control box with two toggle switches and mounted in the chair.

BRIEF DESCRIPTION OF THE DRAWINGS

For a fuller understanding of the invention, reference should be made to the following detailed description, taken in connection with the accompanying drawings, in which.

FIG. **3*a*** is a front plan view of an embodiment of the drive mechanism of the wheelchair modification according to the present invention.

FIG. **3*b*** is a front plan view of an embodiment of the lift mechanism of the wheelchair modification according to the present invention.

FIG. **3*c*** is a front plan view of an embodiment of the wheelchair modification according to the present invention.

FIG. **4*a*** is a top plan view of the aluminum spacer used in an embodiment of the wheelchair modification according to the present invention.

FIG. **4*b*** is a front plan view of the aluminum spacer used in an embodiment of the wheelchair modification according to the present invention.

FIG. **4*c*** is a perspective view of the aluminum spacer used in an embodiment of the wheelchair modification according to the present invention.

FIG. **5*a*** is a top plan view of the alignment channel used in an embodiment of the wheelchair modification according to the present invention.

FIG. **5*b*** is a side plan view of the alignment channel used in an embodiment of the wheelchair modification according to the present invention.

FIG. **5*c*** is a front plan view of the alignment channel used in an embodiment of the wheelchair modification according to the present invention.

FIG. **5*d*** is a perspective view of the alignment channel used in an embodiment of the wheelchair modification according to the present invention.

FIG. **6*a*** is a top plan view of the alignment mount used in an embodiment of the wheelchair modification according to the present invention.

FIG. **6*b*** is a side plan view of the alignment mount used in an embodiment of the wheelchair modification according to the present invention.

FIG. **6*c*** is a front plan view of the alignment mount used in an embodiment of the wheelchair modification according to the present invention.

FIG. **6*d*** is a perspective view of the alignment mount used in an embodiment of the wheelchair modification according to the present invention.

Figure 7C:
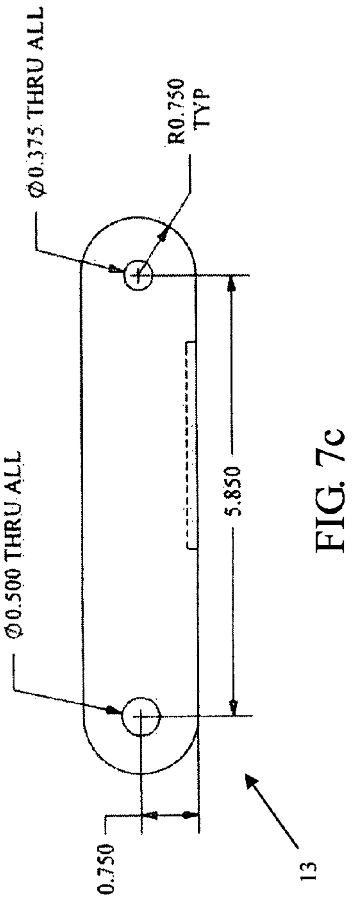
Figure 7D:
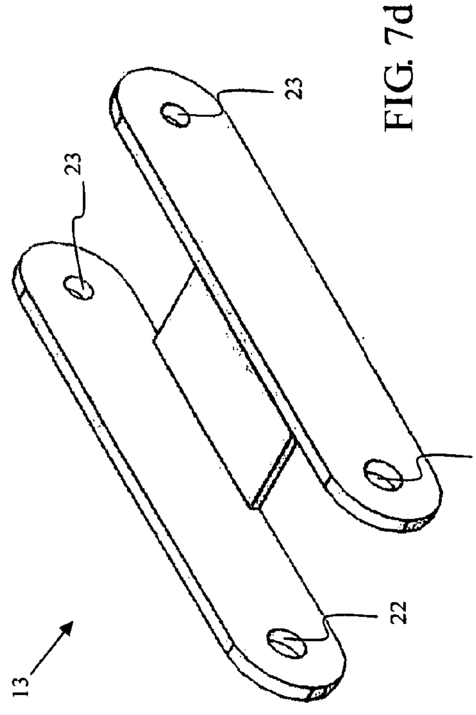
Figure 7A:
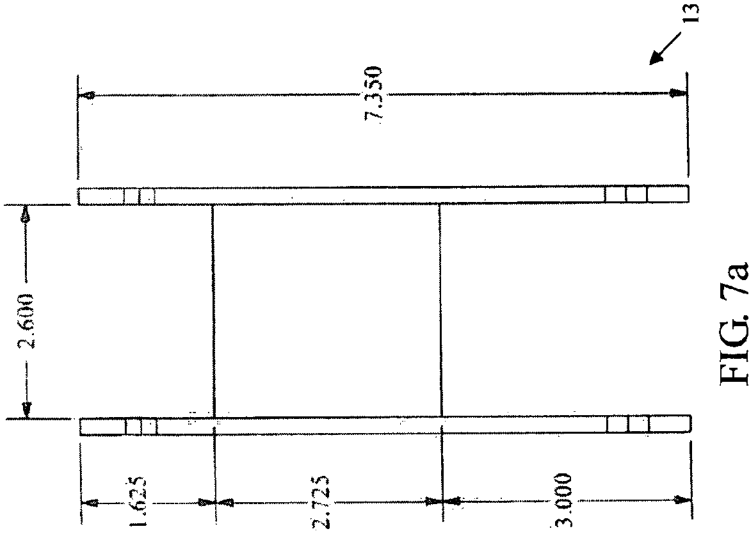

FIG. 7*a* is a top plan view of the lower channel used in an embodiment of the wheelchair modification according to the present invention.

Figure 7B:
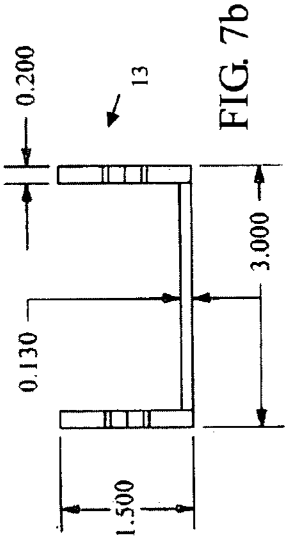

FIG. 7*b* is a side plan view of the lower channel used in an embodiment of the wheelchair modification according to the present invention.

FIG. 7*c* is a front plan view of the lower channel used in an embodiment of the wheelchair modification according to the present invention.

FIG. 7*d* is a perspective view of the lower channel used in an embodiment of the wheelchair modification according to the present invention.

Figure 8C:
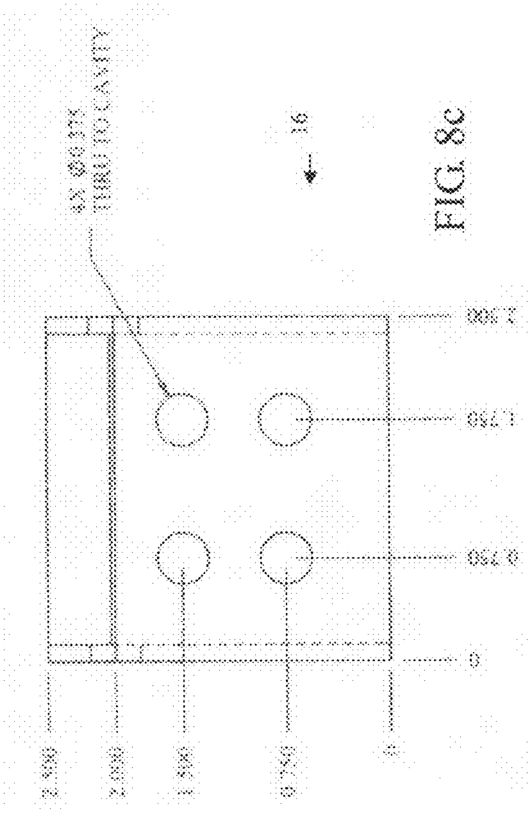
Figure 8D:
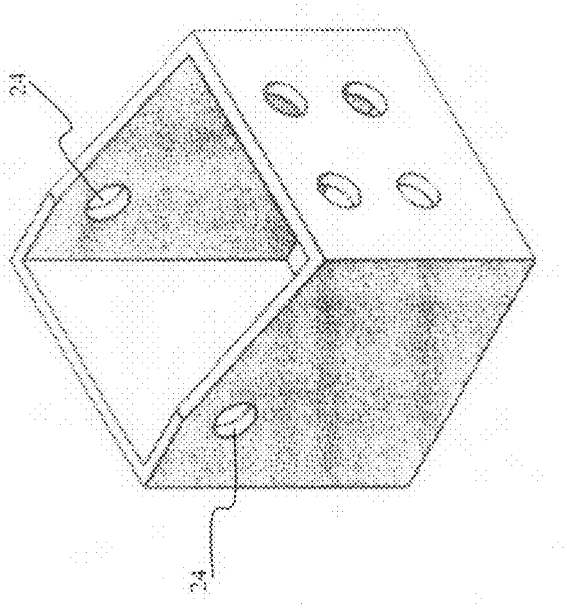
Figure 8A:
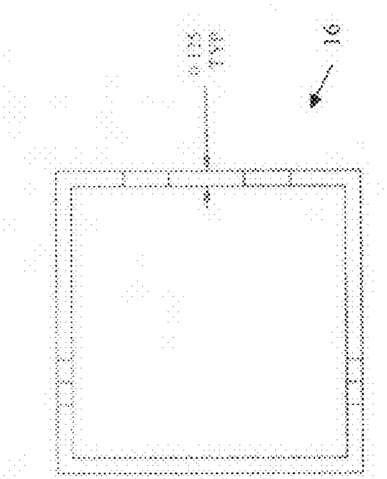

FIG. 8*a* is a top plan view of the square tube used in an embodiment of the wheelchair modification according to the present invention.

Figure 8B:
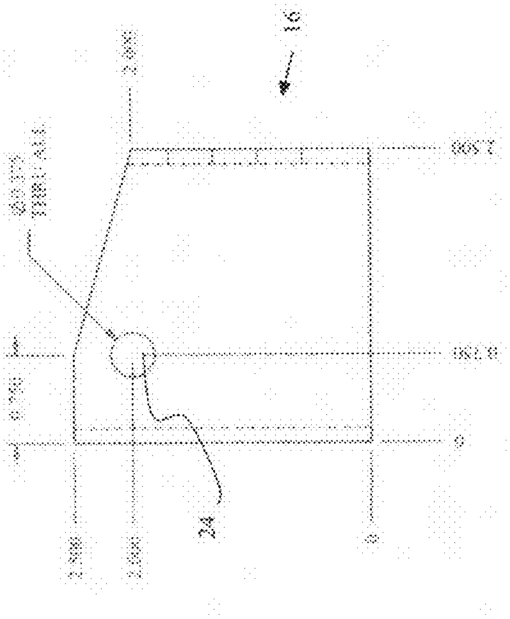

FIG. 8*b* is a side plan view of the square tube used in an embodiment of the wheelchair modification according to the present invention.

FIG. 8*c* is a front plan view of the square tube used in an embodiment of the wheelchair modification according to the present invention.

FIG. 8*d* is a perspective view of the square tube used in an embodiment of the wheelchair modification according to the present invention.

Figure 9C:
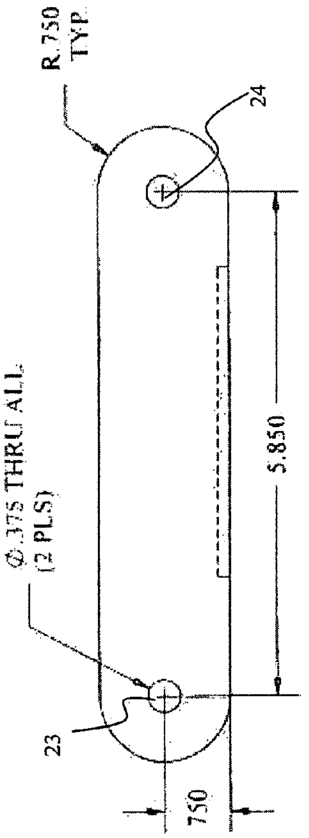
Figure 9D:
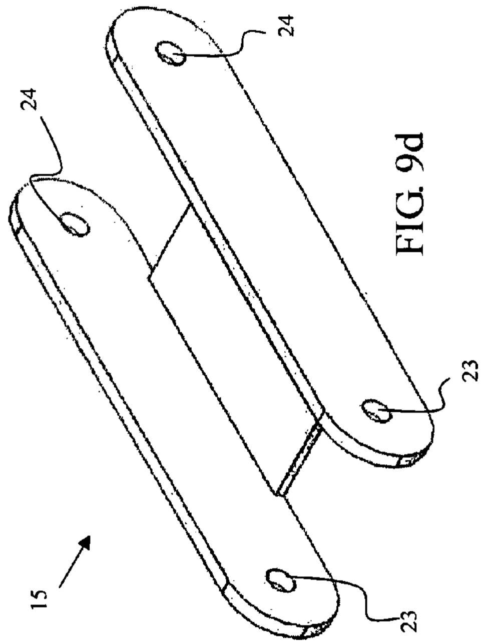
Figure 9A:
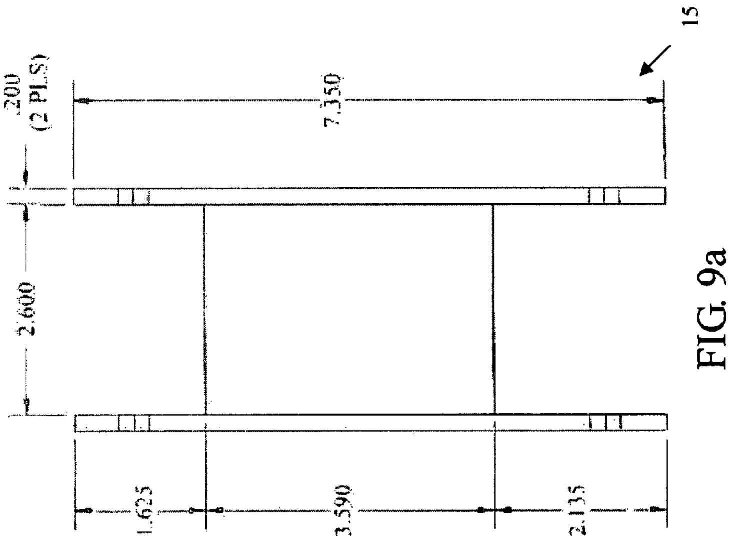

FIG. 9*a* is a top plan view of the upper channel used in an embodiment of the wheelchair modification according to the present invention.

Figure 9B:
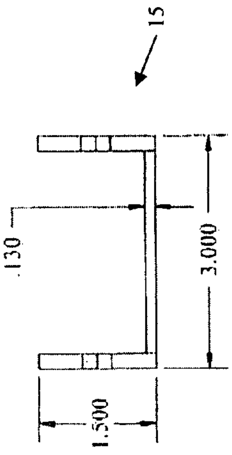

FIG. 9*b* is a side plan view of the upper channel used in an embodiment of the wheelchair modification according to the present invention.

FIG. 9*c* is a front plan view of the upper channel used in an embodiment of the wheelchair modification according to the present invention.

FIG. 9*d* is a perspective view of the upper channel used in an embodiment of the wheelchair modification according to the present invention.

Figure 10A:
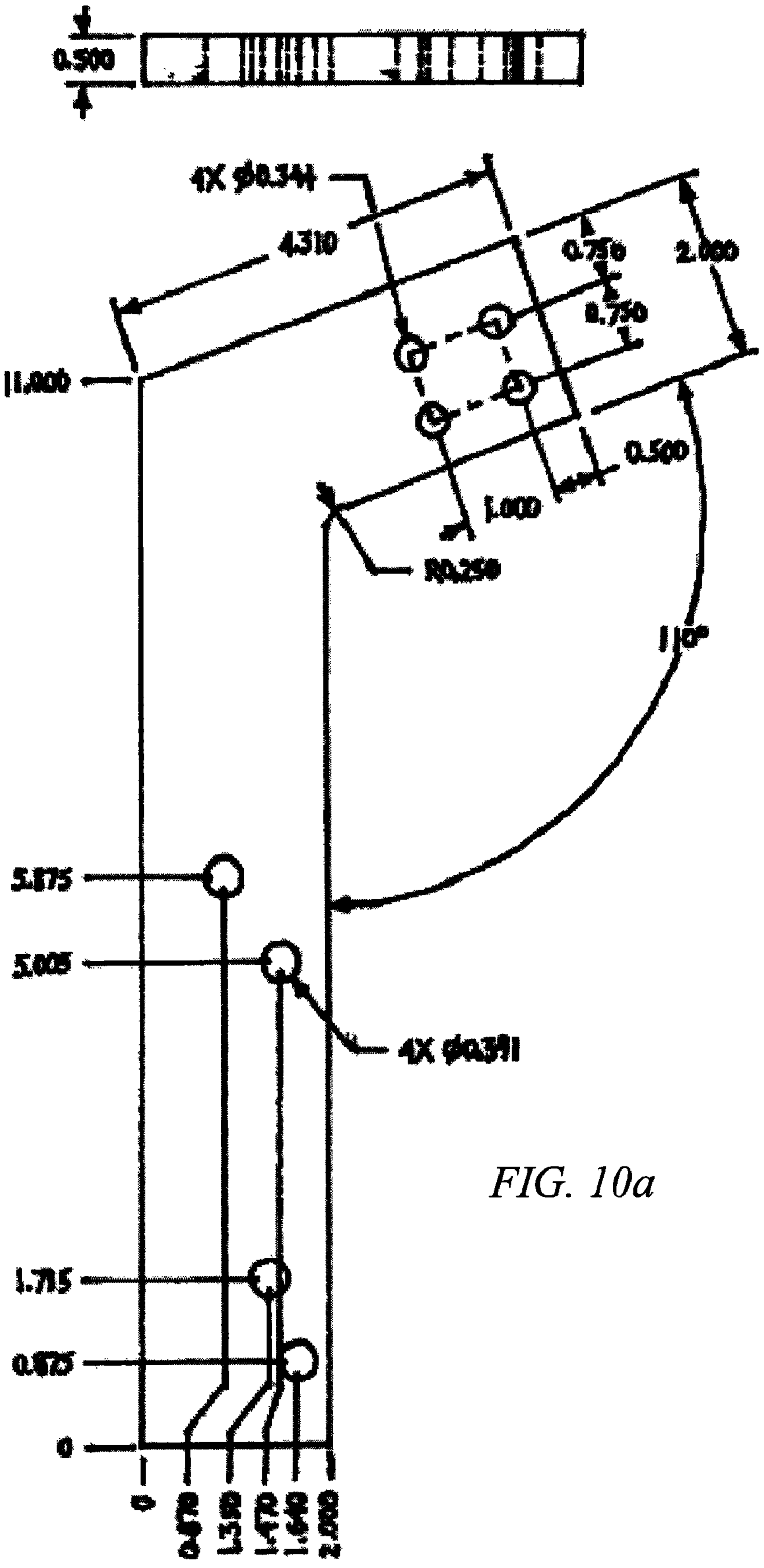

FIG. 10*a* is a front plan view of the L-bracket used in an embodiment of the wheelchair modification according to the present invention.

Figure 10B:
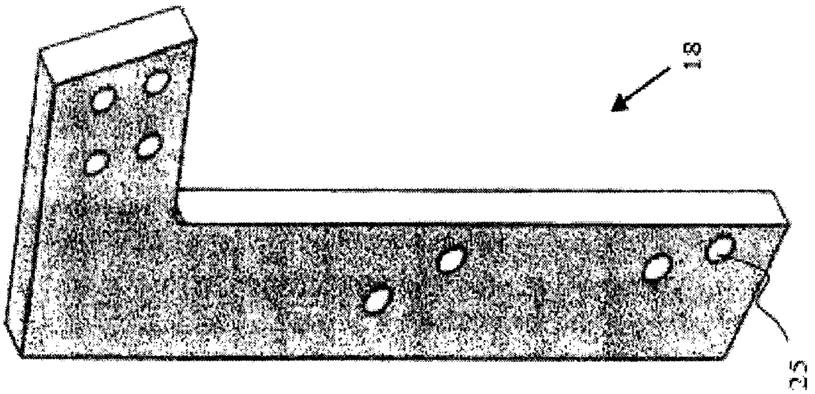

FIG. 10*b* is a perspective view of the L-bracket used in an embodiment of the wheelchair modification according to the present invention.

Figure 11B:
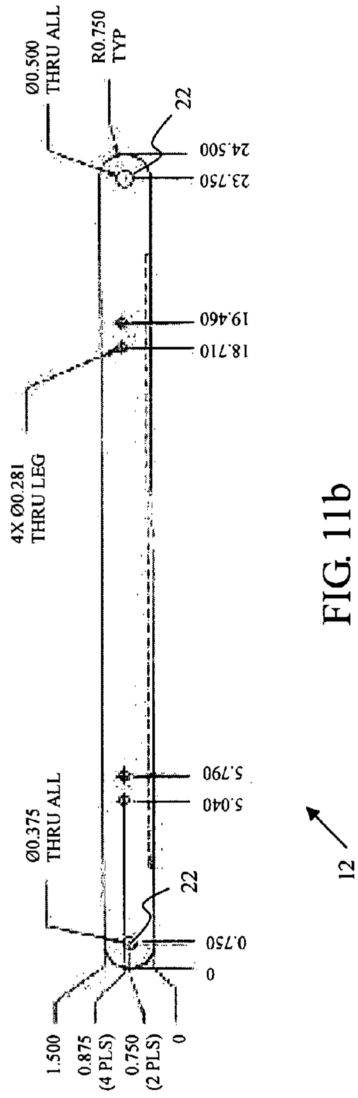
Figure 11C:
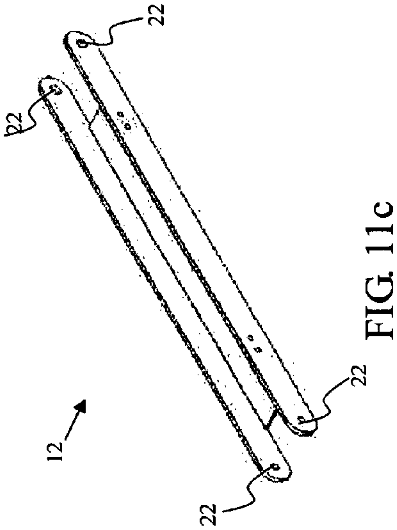
Figure 11A:
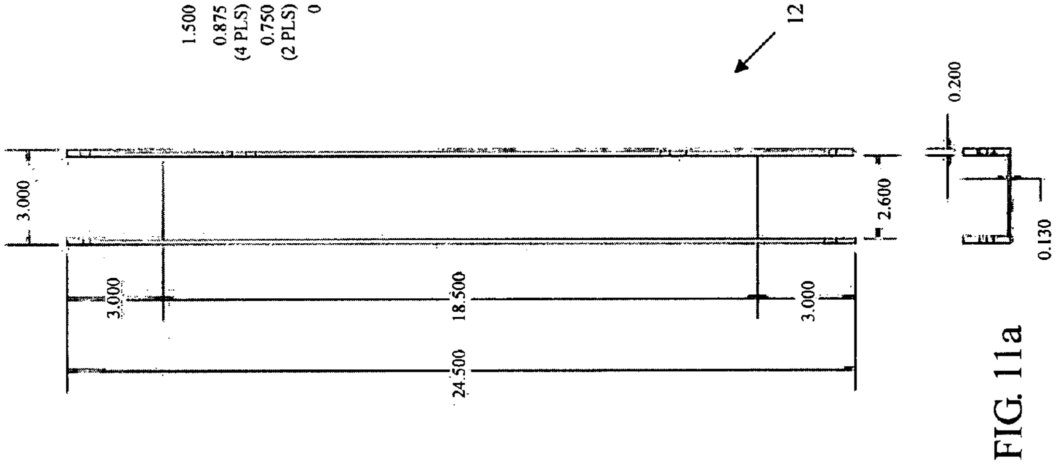

FIG. 11*a* is a top plan view of the base channel used in an embodiment of the wheelchair modification according to the present invention.

FIG. 11*b* is a front plan view of the base channel used in an embodiment of the wheelchair modification according to the present invention.

FIG. 11*c* is a perspective view of the base channel used in an embodiment of the wheelchair modification according to the present invention.

Figure 12:
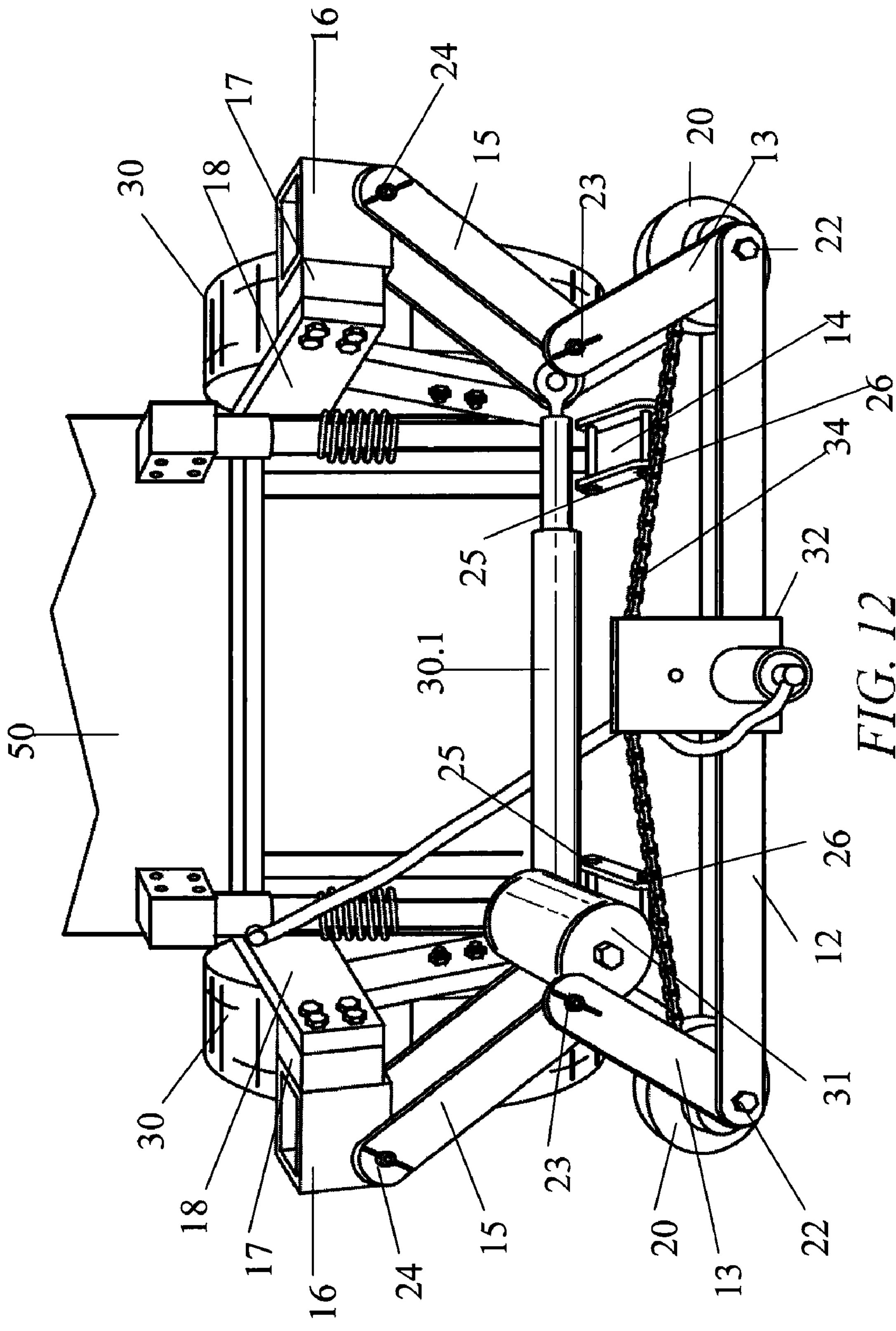

FIG. 12 is an illustration of an embodiment of the wheelchair modification shown incorporated into a motorized wheelchair.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Motorized wheelchairs are generally designed to operate in forward and backward directions and are capable of turning to go in other directions. However, in tight spaces, the use of traditional wheelchair designs is very limited because space is needed to make turns. As a consequence wheelchair users are often unable to maneuver around in, or even into, tight spaces, severely limiting access to many places. The lateral movement mechanism of the current invention attaches to traditional motorized wheelchairs and provides an innovative way of operating motorized wheelchairs in tight spaces, greatly expanding the space a wheelchair user can access. A user can simply move sideways without backing up and turning, as was required by traditional designs.

As used herein, the term "actuator" refers to any mechanical device for moving or controlling the lift mechanism or providing rotational force to the wheels. For example, an actuator can be an electrical motor, pneumatic actuators, hydraulic pistons, relays and comb drives. While motors are mostly used when circular motion is needed, as to power the wheels, motors can also be used for linear applications, such as to actuate the lift mechanism, by transforming circular to linear motion (such as with a bolt and screw transducer).

Figure 1:
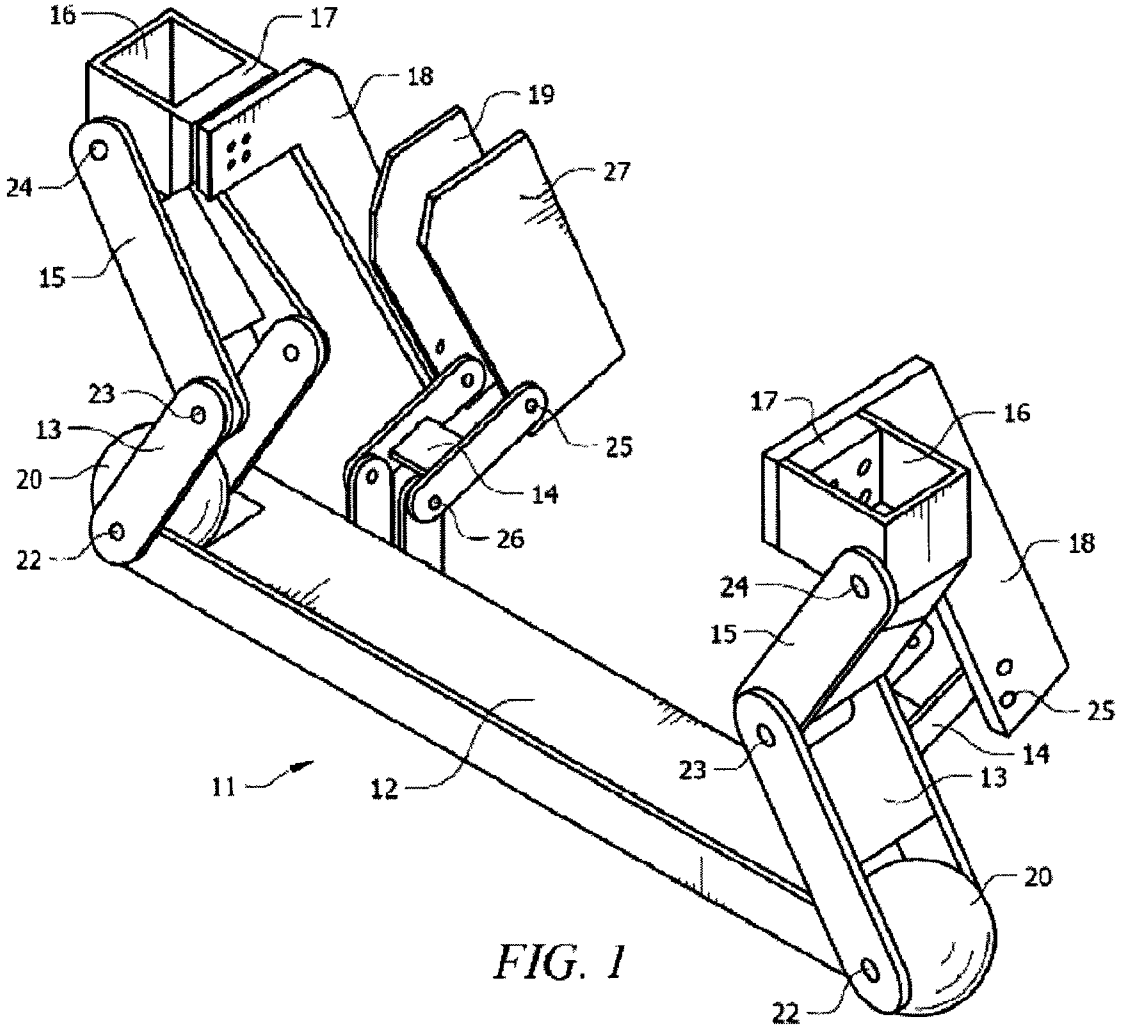
FIG. 1 is a perspective view of an embodiment of the wheelchair modification according to the present invention.

With reference to FIG. 1 there is shown a lateral wheelchair movement attachment 11 in accordance with an embodiment of the present invention. The wheelchair attachment 11 has a base channel 12 that provides horizontal support to the structure. The base channel 12 connects on each end to a lateral wheel 20 and a lower channel 13. The lateral wheels 20 and lower channels 13 are connected at a base axle 22 so that the lateral wheels 20 spin freely and the lower channels 13 are capable of movement about the base axle 22. The opposite end of each of the lower channels 13 is connected on a mid-level axle 23 to an upper channel 15 so that both the lower channel 13 and the upper channel 15 are capable of movement about the mid-level 23 axle. Both sets of upper 15 and lower 13 channels combine in a scissor-like motion to provide the raising and lowering mechanism of the wheelchair attachment 11. The opposite end of the upper channels 15 are each connected at an upper axle 24 to a square tubing. Movement is allowed along the upper axle 24 to aid in the raising and lowering mechanism of the wheelchair attachment 11. Each square tubing 16 is fixedly attached to an aluminum spacer 17, which is also fixedly attached to an L-Bracket 18. Each L-bracket 18 is fixedly attached to an outer extension bracket 19. Each outer extension bracket 19 is connected to the backside of an alignment channel 14 along a back axle 25. An inner extension bracket 27, being the same size and shape of the outer extension bracket 19, is connected along the back axle 25 to the opposite side of the alignment channel 14 in parallel to the outer extension bracket 19. Movement is allowed along the back axle 25 to aid in the raising and lowering mechanism of the wheelchair attachment 11. The combination of the inner extension bracket 27 and the outer extension bracket 19 creates the means with which the wheelchair attachment is attached to the wheelchair 50. The front-side of each of the alignment channels 14 is connected to an alignment mount 21 by a front axle 26. The alignment channel 14 is capable of movement about the front axle 26. Each alignment mount is attached to the backside of the base channel 12. Both combinations of the alignment channel 14 and the inner 27 and outer 19 extension brackets work in a scissor-like motion, along with the upper 15 and lower 13 channel combinations, to provide the raising and lowering mechanism of the wheelchair attachment 11.

Figure 2:
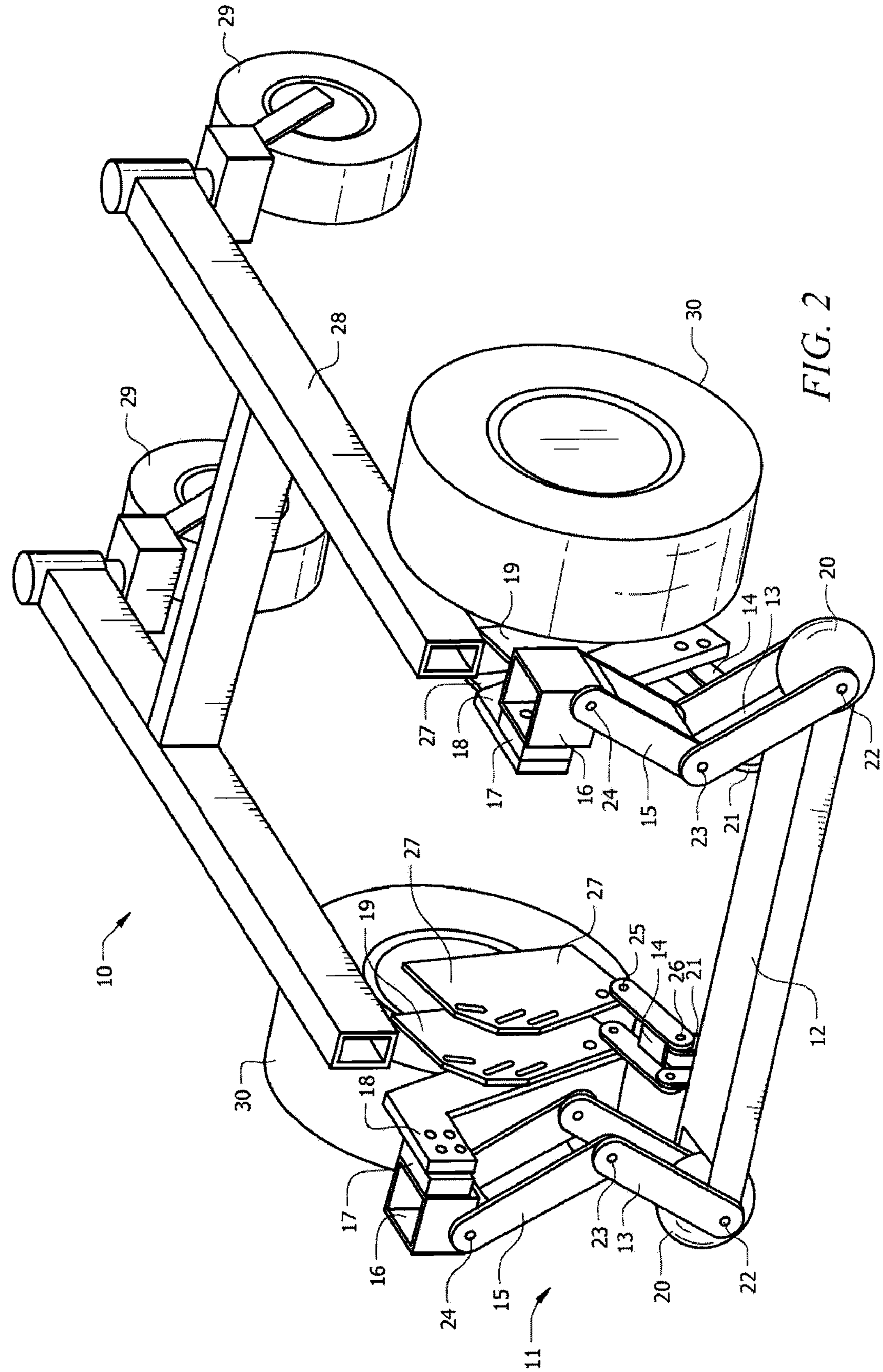
FIG. 2 is a perspective view of an embodiment of the wheelchair modification according to the present invention shown incorporated into a wheelchair platform.

As shown in FIG. 2, a traditional wheelchair platform 10 consists of an H-shaped frame 28 with two front wheels 29 and two rear wheels 30. One front wheel 29 is attached at each of the two front corners of the H-shaped frame 28. The front wheels 29 are attached in a manner the permits swiveling and are therefore conducive to lateral movement. One rear wheel 30 is attached at each of the back corners of the H-shaped frame 28 and is fixed in a manner that only allows forward and backward motion and when in contact with the ground prohibits lateral movement. In order to provide lateral movement, the lateral wheels 20 must be lowered to make contact with the ground and the rear wheels 30 must be lifted off the ground. This vertical movement is allowed by the scissor-like motion of both the upper 15 and lower channels 13 and the alignment channel 14 and outer 19 and inner 27 extension brackets. The lateral wheels 20 are positioned perpendicular to the rear wheels 30, so once vertical movement is complete lateral movement becomes possible.

Figure 3A:
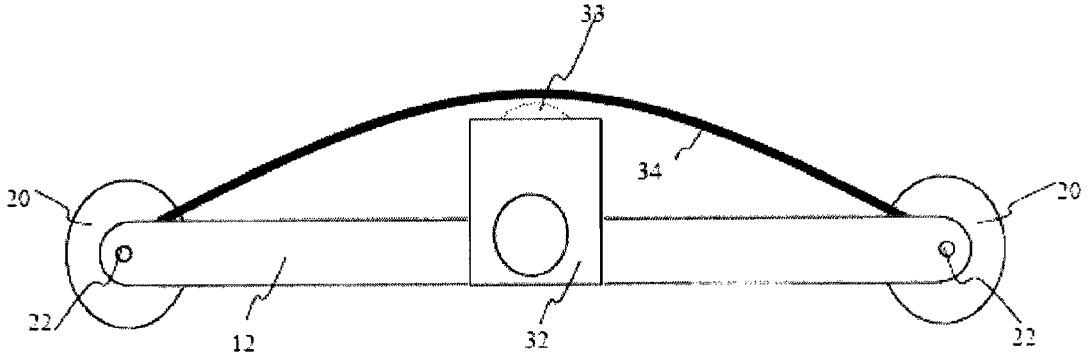
Figure 3B:
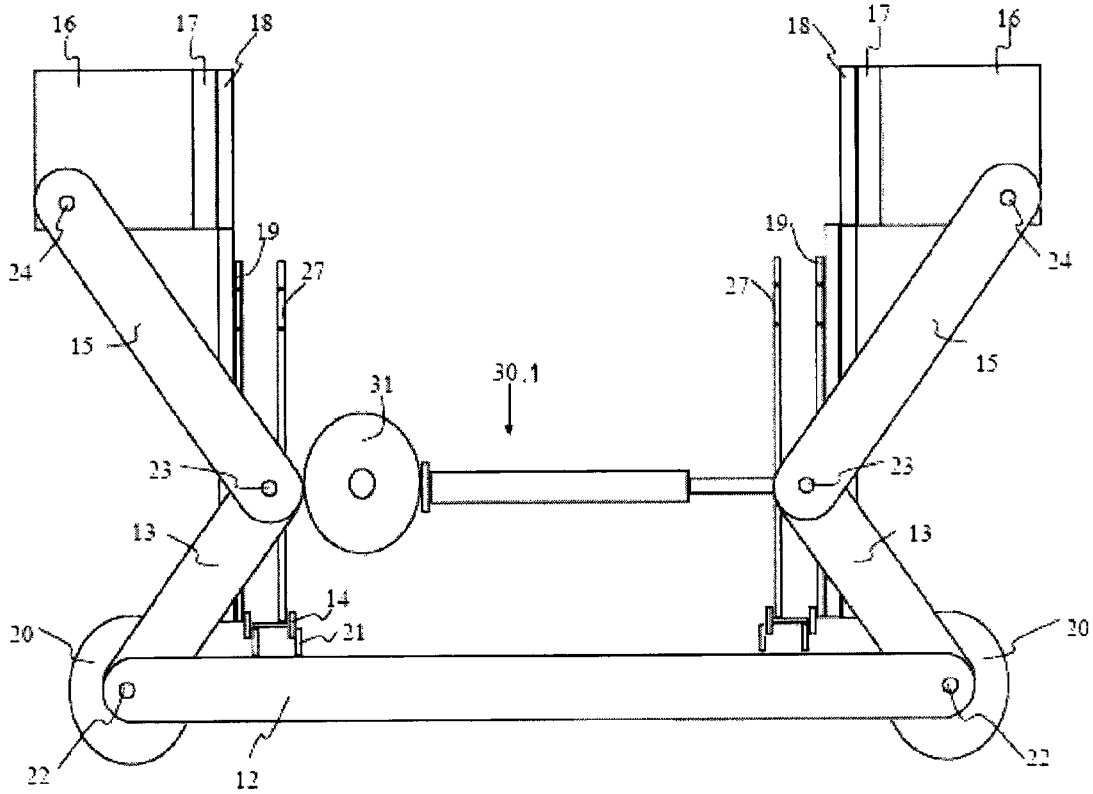
Figure 3C:
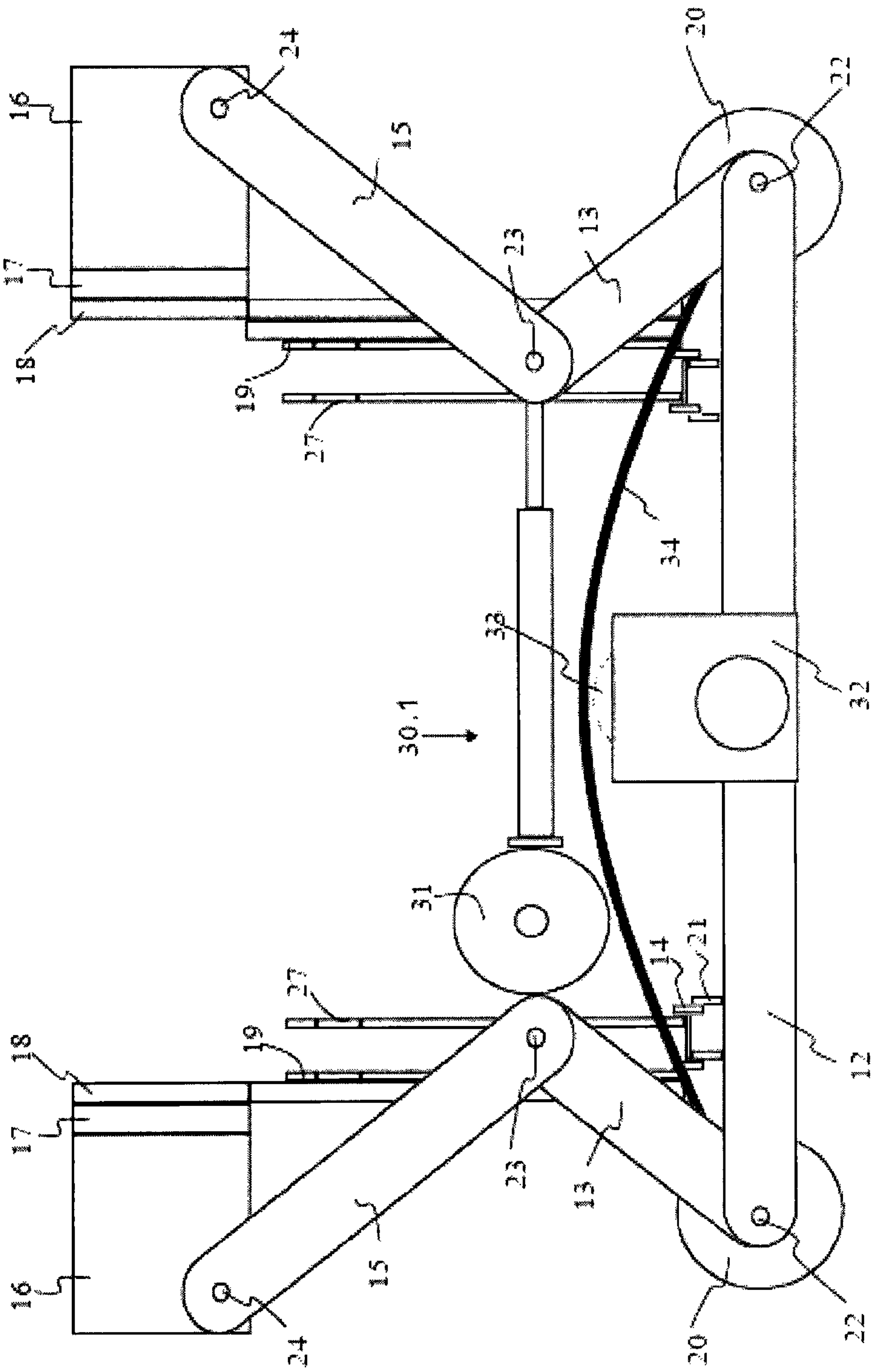
Figure 4C:
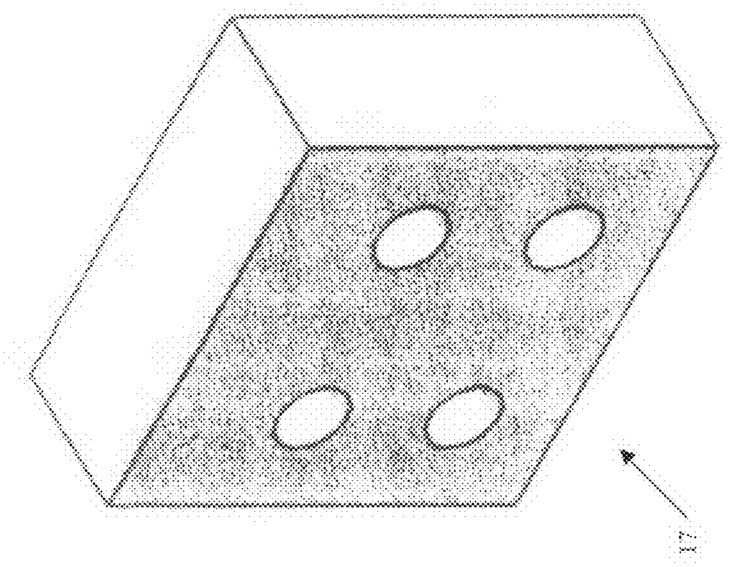
Figure 4A:
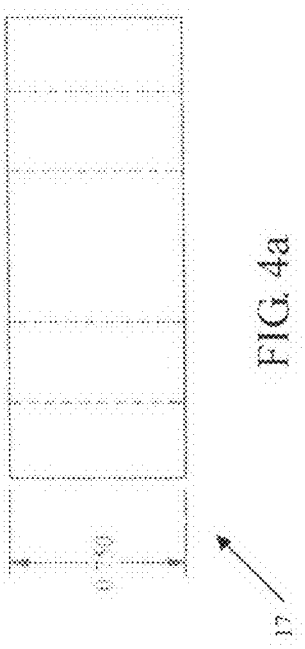
Figure 4B:
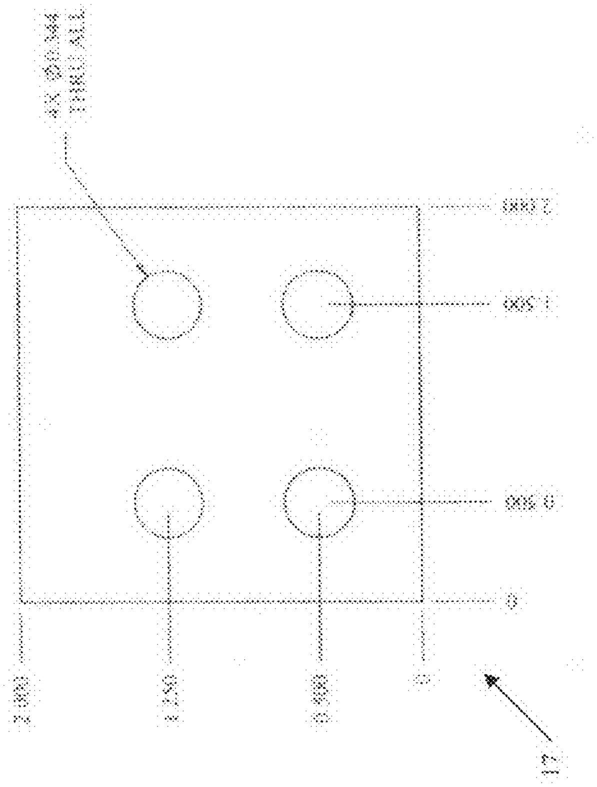
Figures 5A, 5B, 5C, 5D:
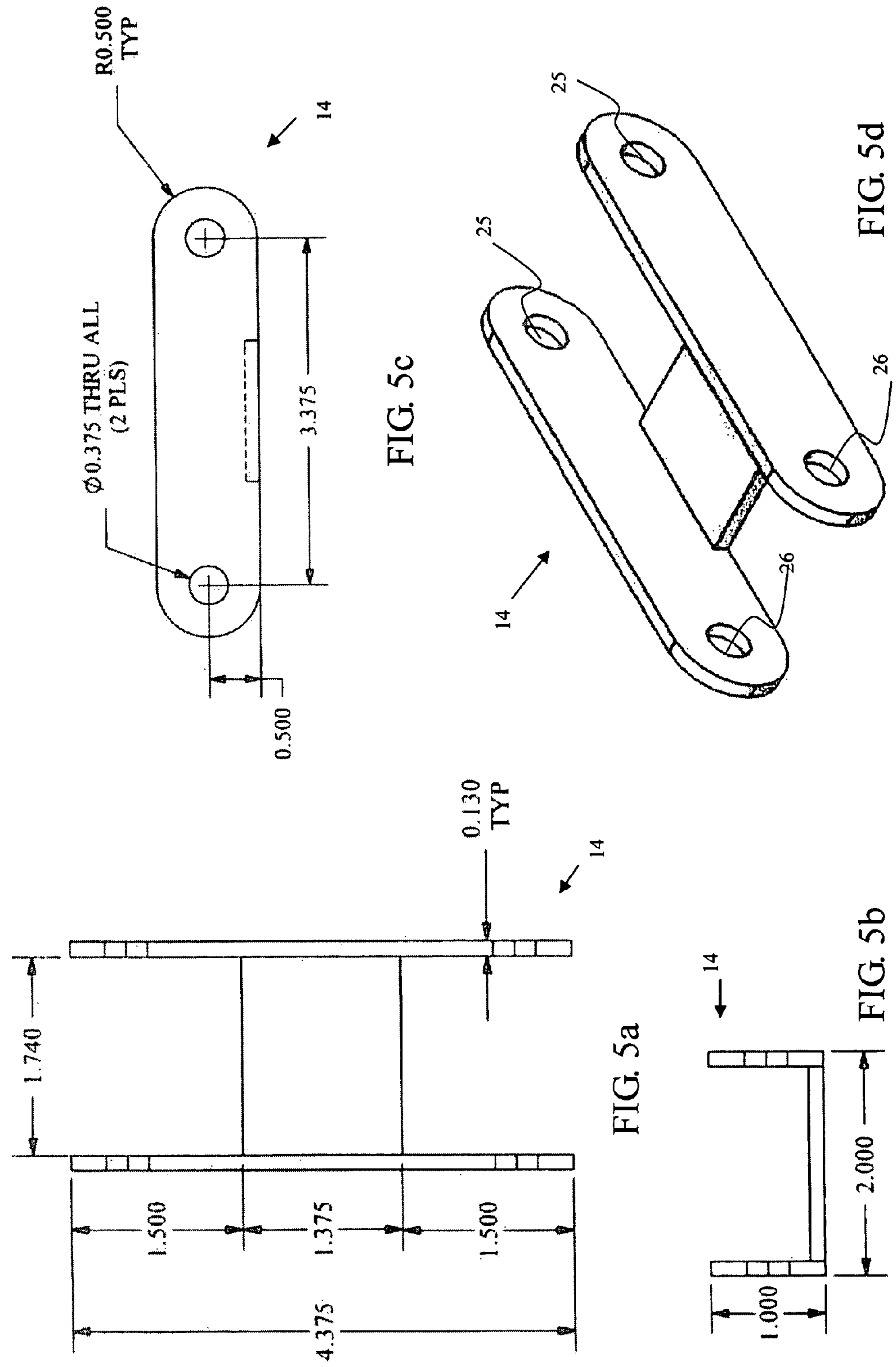
Figure 6C:
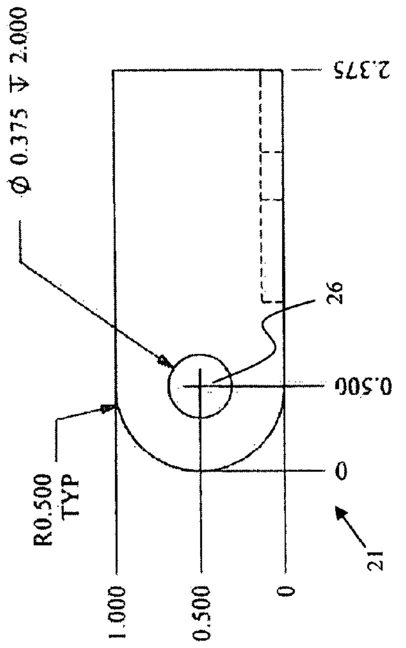
Figure 6D:
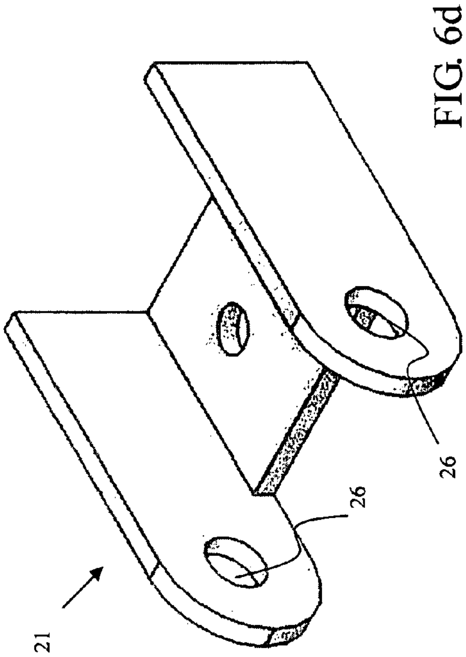
Figure 6A:
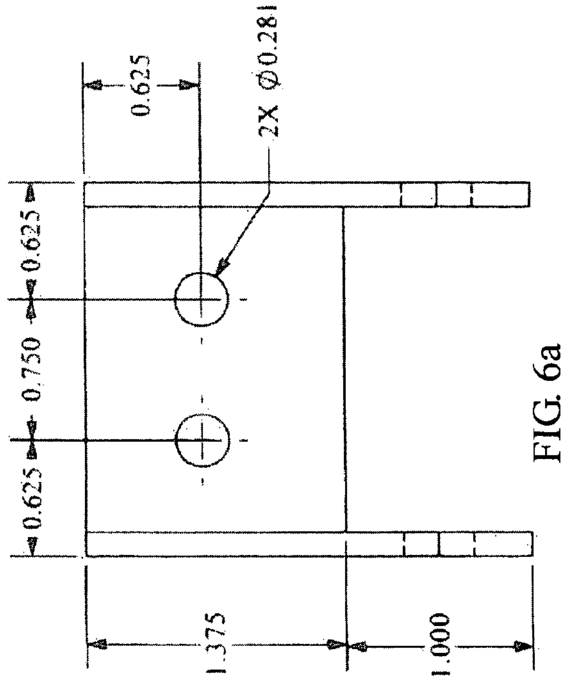
Figure 6B:
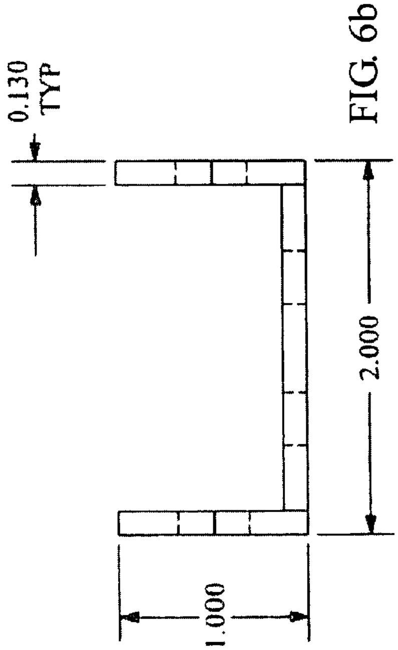

As shown in FIGS. 3*b* and 3*c*, a piston 30.1 powered by its own motor 31 is attached to the device in a plane parallel and above the base channel. The piston motor 31 is attached to an upper channel 15 in the same plane as the mid-level axle 23 in such a way that it makes no contact with the mid-level axle 23 and does not inhibit the upper 15 and lower 13 channels' movement about the mid-level axle 23. The free side of the piston is connected to the mid-level axle 23 on the opposite side by an O-ring which does not prohibit movement of the upper 15 and lower 13 channels. As the piston 30.1 expands the upper 15 and lower 13 channels are pushed outwards towards vertical positions, which results in the lifting of the wheelchair 50 and its rear wheels 30 off the ground and the lowering of the lateral wheels 20 to the ground. As the piston 30.1 contracts the upper 15 and lower 13 channels are pulled inward towards horizontal positions, which results in the lowering of the wheelchair 50 and its rear wheels 30 to the ground and the raising of the lateral wheels 20 off the ground.

As shown in FIG. 3*a* and 3*c*, lateral movement is accomplished by a cabling system. A DC motor 32 that provides the lateral driving force is attached to the center base channel 12. A sprocket 33 is attached to the motor 32, which connects to a cable 34 that wraps around one base axle 22, then under the base channel 12, around the other base channel 12 and back to the sprocket 33. When the motor causes the sprocket to rotate, the cable begins moving which rotates the lateral wheels in the same direction and at the same rate. This rotation causes the wheelchair to more laterally.

The control mechanism for both the piston motor 31 and the lateral driving motor 32 are wired into a control box with two toggle switches. The control box is then mounted in the chair. The controller box consists of two three-position toggle switches. One switch controls lift and the other control left and right movements. Using the control mechanism, a user can lift the wheelchair 50, move it laterally in either direction, and then lower it back to the ground.

The invention has many user-friendly features. It utilizes pins instead of bolts in certain areas to provide easy disassembly to replace the batteries. An overall maximum width of 36" allows easy accessibility through common household doors. Also, a light aluminum channel design reduces excess weight.

The motor provides enough power to lift up to 400 pounds, including the wheelchair. For example, a wheelchair that incorporated the present invention and weighing 150 pounds could support a person weighing up to 250 pounds. A chain-driven system for lateral movement instead of a belt to increase the product life and dependability in harsher weather.

Utility can also be enhanced by modifications in manufacturability, material type, alignment cables, motor selection, and mechanism controls which are contemplated. Examples include:

Manufacturability—The aluminum channel size can be downscaled to reduce the overall weight of the mechanism and also reduced cost. The current design optimizes safety and the range of lateral movement, but can be downscaled without considerable loss of the benefits of the current optimization.

Material Type—The use of alternative materials may be more feasible. Specifically, in a non-load bearing component such as the base channel, the use of a composite may reduce cost in the future with the current rising costs of aluminum.

Alignment Cables—Higher-grade hardware or a modified cable design that allows the cables to attach directly to the channels would significantly improve operation of the invention. In the current design, the alignment cables are holding the base channel and the lower channel and restrict their movement relative to each other. However, the screw cable stops used to hold these cables are insufficient. Their long length, as they extend off the back of the channel, creates a moment arm of ~0.750 inches. This moment arm when coupled with the force causes the cable stops to plastically deform. Improvements in the alignment cables would significantly reduce or completely remove the problem of plastic deformation.

Motor/Actuator Selection—More powerful motors could be used which would allow an increase in weight capacity, thereby increasing the range and number of possible users.

Mechanism Control—Programming controls and wiring schematics could be improved and integrated into a wheelchair's already existing programming panels.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An apparatus for use with a wheelchair having a rear portion with rear wheels, comprising:

a base having a first and a second end;

a pair of lateral wheels connected to said base at said first and second ends, respectively;

said lateral wheels being disposed behind said rear wheels of said wheelchair;

a means for attaching said apparatus to said rear of said wheelchair;

a first lower-linkage having a first and second end, said first end of said lower-linkage being hingedly connected to said first end of said base;

a second lower-linkage having a first and second end, said first end of said second lower-linkage being hingedly connected to said second end of said base;

a first upper-linkage having a first and second end, said first end of said first upper-linkage being hingedly connected to said second end of said first lower-linkage;

a second upper-linkage having a first and a second end, said first end of said second upper-linkage being hingedly connected to said second end of said second lower-linkage;

a pair of secondary linkages transverse to said lateral wheels and hingedly connected to said base; and a first actuator adapted to provide rotational force to said pair of lateral wheels.

2. The apparatus of claim 1, further comprising: a second actuator disposed between said first upper-linkage and said second upper-linkage.

3. The apparatus of claim 1, further comprising: a second actuator disposed between said first lower-linkage and said second lower-linkage.

4. The apparatus of claim 1, further comprising: said attachment means being a set of inner and outer extension brackets.

5. The apparatus of claim 1, further comprising: a second actuator disposed between the junction of said first lower-linkage and first upper-linkage and said second lower-linkage and second upper-linkage.

* * * * *